US008701818B2

(12) United States Patent
Shirao et al.

(10) Patent No.: US 8,701,818 B2
(45) Date of Patent: Apr. 22, 2014

(54) WORK VEHICLE AND CONTROL METHOD FOR WORK VEHICLE

(75) Inventors: Atsushi Shirao, Komatsu (JP); Shigeo Hashimoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/699,254

(22) PCT Filed: May 9, 2012

(86) PCT No.: PCT/JP2012/061878
§ 371 (c)(1),
(2), (4) Date: Nov. 20, 2012

(87) PCT Pub. No.: WO2013/145337
PCT Pub. Date: Oct. 3, 2013

(65) Prior Publication Data
US 2013/0256053 A1 Oct. 3, 2013

(30) Foreign Application Priority Data

Mar. 29, 2012 (JP) ................................. 2012-075600

(51) Int. Cl.
*E02F 9/22* (2006.01)
(52) U.S. Cl.
USPC ........................................ 180/305; 180/306
(58) Field of Classification Search
USPC ........................................ 180/305, 306, 307
See application file for complete search history.

(56) References Cited

U.S. PATENT DOCUMENTS

| 3,199,286 | A | * | 8/1965 | Anderson | 60/420 |
|---|---|---|---|---|---|
| 3,285,000 | A | * | 11/1966 | Christenson et al. | 60/423 |
| 3,331,480 | A | * | 7/1967 | Christenson et al. | 192/220 |
| 3,752,013 | A | * | 8/1973 | Cross | 475/32 |
| 4,317,331 | A | * | 3/1982 | Aruga et al. | 60/436 |
| 5,683,322 | A | | 11/1997 | Meyerle | |
| 5,897,176 | A | * | 4/1999 | Dvorak et al. | 303/151 |
| 2003/0019702 | A1 | * | 1/2003 | Goedecke et al. | 188/353 |
| 2005/0072965 | A1 | * | 4/2005 | Sanders et al. | 254/361 |
| 2006/0150809 | A1 | | 7/2006 | Shah | |
| 2006/0225971 | A1 | * | 10/2006 | Jaeger | 188/106 P |
| 2010/0050620 | A1 | * | 3/2010 | Basana et al. | 60/327 |
| 2010/0094515 | A1 | | 4/2010 | Shirao et al. | |
| 2010/0190605 | A1 | * | 7/2010 | Petzold | 477/111 |
| 2012/0151905 | A1 | * | 6/2012 | Lenton | 60/327 |

FOREIGN PATENT DOCUMENTS

| EP | 1 350 990 A1 | 8/2003 |
|---|---|---|
| EP | 1 431 628 A1 | 6/2004 |

(Continued)

OTHER PUBLICATIONS

The Extended European Search Report for the corresponding European application No. 12780629.7 issued on Dec. 20, 2013.

*Primary Examiner* — J. Allen Shriver, II
*Assistant Examiner* — Bridget Avery
(74) *Attorney, Agent, or Firm* — Global IP Counselors, LLP (57) ABSTRACT

A working vehicle includes an engine, a hydraulic pump, a first hydraulic motor, a vehicle speed detecting unit, a parking brake, a parking brake operating member and a control unit. The control unit is configured to determine whether the vehicle speed is equal to or greater than a predetermined threshold when the parking brake operating member is operated. The control unit is configured to execute a brake control that decreases a displacement of the first hydraulic pump and increases a displacement of the first hydraulic motor without activating the parking brake when the vehicle speed is equal to or greater than the predetermined threshold in a state when the vehicle is traveling, and to activate the parking brake when the vehicle speed falls below the predetermined threshold.

5 Claims, 6 Drawing Sheets

(56) References Cited

FOREIGN PATENT DOCUMENTS

| | | |
|---|---|---|
| JP | 3-67752 U | 7/1991 |
| JP | 8-268320 A | 10/1996 |
| JP | 11-321599 A | 11/1999 |
| JP | 2005-067496 A | 3/2005 |
| WO | 99/38738 A1 | 8/1999 |
| WO | WO-02/50454 A1 | 6/2002 |
| WO | 2010/025133 A2 | 3/2010 |

\* cited by examiner

WORK VEHICLE AND CONTROL METHOD FOR WORK VEHICLE

CROSS-REFERENCE TO RELATED APPLICATIONS

This application claims priority to Japanese Patent Application No. 2012-075600 filed on Mar. 29, 2012, the disclosure of which is hereby incorporated herein by reference in its entirety.

TECHNICAL FIELD

The present invention relates to a work vehicle and a control method for a work vehicle.

BACKGROUND ART

A so-called hydrostatic transmission (HST) is generally installed in a work vehicle such as a wheel loader and the like. In a HST type of work vehicle, a hydraulic pump is driven by an engine and a hydraulic motor for traveling is driven by hydraulic fluid discharged from the hydraulic pump. As a result, the work vehicle travels. Vehicle speed and tractive force can be controlled in this type of HST work vehicle by controlling the engine rotation speed, the displacement of the hydraulic pump, and the displacement of the hydraulic motor for traveling (see International Publication WO 2002/050454).

The work vehicle also includes a parking brake. The parking brake is activated by an operator operating a parking brake operating member such as a parking switch. Normally, the operator decelerates the work vehicle by using a foot brake and the like and operates the parking brake when the work vehicle is in a stopped state. As a result, the work vehicle is made so as not to move from the stopped position.

SUMMARY

As described above, a parking brake is normally activated when the work vehicle is in a stopped state. However, the operator may accidentally or intentionally operate the parking brake operating member while the work vehicle is traveling. In this case, a shock may occur due to the vehicle decelerating rapidly.

An object of the present invention is to provide a work vehicle and a control method for a work vehicle that can decelerate the vehicle while suppressing the occurrence of a shock when the parking brake is operated while the vehicle is traveling.

A work vehicle according to a first aspect of the present invention includes an engine, a hydraulic pump, a hydraulic motor for traveling, a vehicle speed detecting unit, a parking brake, a parking brake operating member, and a control unit. The hydraulic pump is driven by the engine. The first hydraulic motor is driven by hydraulic fluid discharged from the hydraulic pump. The vehicle speed detecting unit detects a vehicle speed. The parking brake operating member is operated to activate the parking brake. The control unit executes a brake control. The control unit determines whether the vehicle speed is equal to or greater than a predetermined threshold when the parking brake operating member is operated under the brake control. The control unit decreases the displacement of the hydraulic pump and increases the displacement of the first hydraulic motor without activating the parking brake when the vehicle speed is equal to or greater than the predetermined threshold while the vehicle is in a traveling state. The control unit then activates the parking brake when the vehicle speed falls below the predetermined threshold.

The work vehicle according to a second aspect of the present invention is the work vehicle of the first aspect, wherein the control unit, under the brake control, decreases the vehicle speed by gradually increasing a lower limit of the first hydraulic motor displacement from the first hydraulic motor displacement at the point in time the parking brake operating member is operated to the maximum displacement.

The work vehicle according to a third aspect of the present invention is the work vehicle of the first and second aspects, and further includes a drive shaft, a second hydraulic motor, and a clutch. Driving power is transferred from the first hydraulic motor to the drive shaft. The second hydraulic motor is driven by hydraulic fluid discharged from the hydraulic pump. The clutch is switched between an engaged state and a disengaged state. In the engaged state, the clutch couples the second hydraulic motor and the drive shaft. In the disengaged state, the clutch uncouples the second hydraulic motor and the drive shaft. The control unit sets the clutch to the disengaged state when the vehicle speed is equal to or greater than a predetermined switching speed. The control unit sets the clutch to the engaged state when the vehicle speed is smaller than a predetermined switching speed. The control unit activates the parking brake under the brake control when the clutch is switched to the engaged state.

A control method for a work vehicle according to a fourth aspect of the present invention includes an engine, a hydraulic pump, a hydraulic motor for traveling, a vehicle speed detecting unit, a parking brake, and a parking brake operating member. The hydraulic pump is driven by the engine. A first hydraulic motor is driven by hydraulic fluid discharged from the hydraulic pump. The vehicle speed detecting unit detects the vehicle speed. The parking brake operating member is operated to activate the parking brake. The control method includes the following steps. The first step is determining whether the vehicle speed is equal to or greater than a predetermined threshold when the parking brake operating member is operated. The second step is decreasing the displacement of the hydraulic pump and increasing the displacement of the first hydraulic motor without activating the parking brake when the vehicle speed is equal to or greater than the predetermined threshold in a state when the vehicle is traveling. The third step is activating the parking brake when the vehicle speed falls below the predetermined threshold.

A control method for a work vehicle according to a fifth aspect of the present invention includes an engine, a hydraulic pump driven by the engine, a first hydraulic motor driven by hydraulic fluid discharged from the hydraulic pump, a vehicle speed detecting unit that detects a vehicle speed, a parking brake, and a parking brake operating member that is operated for activating the parking brake. The control method for the work vehicle includes determining whether a vehicle speed is equal to or greater than a predetermined threshold when the parking brake operating member is operated; gradually decreasing the vehicle speed by increasing a resistance three of the first hydraulic motor without activating the parking brake when the vehicle speed is equal to or greater than the predetermined threshold in a state when the vehicle is traveling; and activating the parking brake when the vehicle speed is less than the predetermined threshold.

The work vehicle according to the first aspect of the present invention is configured so that the displacement of the hydraulic pump is decreased and the displacement of the first hydraulic motor is increased without activating the parking brake when the vehicle speed is equal to or greater than the predetermined threshold even if the parking brake operating member is operated. The resistance three of the first hydraulic motor is increased when the displacement of the first hydraulic motor increases. Accordingly, the vehicle speed can be decreased gradually. The parking brake is activated when the vehicle speed falls below the predetermined threshold. As a result, the vehicle can be further decelerated while suppressing the occurrence of a shock.

The work vehicle according to the second aspect of the present invention is able to suppress sudden changes to the displacement of the first hydraulic motor. As a result, deceleration is possible while suppressing the occurrence of a shock.

The work vehicle according to the third aspect of the present invention is configured to travel as a result of the driving power from both the first hydraulic motor and the second hydraulic motor due to the clutch entering the engaged state when the vehicle speed is lower than the predetermined switching speed. As a result, a high driving torque can be obtained when traveling at a slow speed. The work vehicle is further configured to travel as a result of the driving power from the first hydraulic motor due to the clutch entering a disengaged state when the vehicle speed is equal to or greater than the predetermined switching speed. Accordingly, fuel consumption while traveling at a high speed can be improved. Further, although the parking brake is operated when the vehicle speed is decreased to reach the predetermined switching speed, the second hydraulic motor is driven when the vehicle speed is equal to or less than the predetermined switching speed. Therefore, deceleration is possible with less shock. Moreover, loads on devices such as the hydraulic pumps and piping can be decreased.

The work vehicle according to the fourth aspect of the present invention is configured so that the displacement of the hydraulic pump is decreased and the displacement of the first hydraulic motor is increased without activating the parking brake when the vehicle speed is equal to or greater than the predetermined threshold even when the parking brake operating member is operated. The resistance force of the first hydraulic motor is increased when the displacement of the first hydraulic motor increases. Accordingly, the vehicle speed can be decreased gradually. The parking brake is activated when the vehicle speed falls below the predetermined threshold. As a result, the vehicle can be further decelerated while suppressing the occurrence of a shock.

The work vehicle according to the fifth aspect of the present invention is configured so that the resistance force of the first hydraulic pump is increased and the vehicle speed is gradually decreased without activating the parking brake when the vehicle speed is equal to or greater than the predetermined threshold even if the parking brake operating member is operated. The parking brake is activated when the vehicle speed falls below the predetermined threshold. As a result, the vehicle can be further decelerated while suppressing the occurrence of a shock.

DESCRIPTION OF EMBODIMENTS

Figure 1:
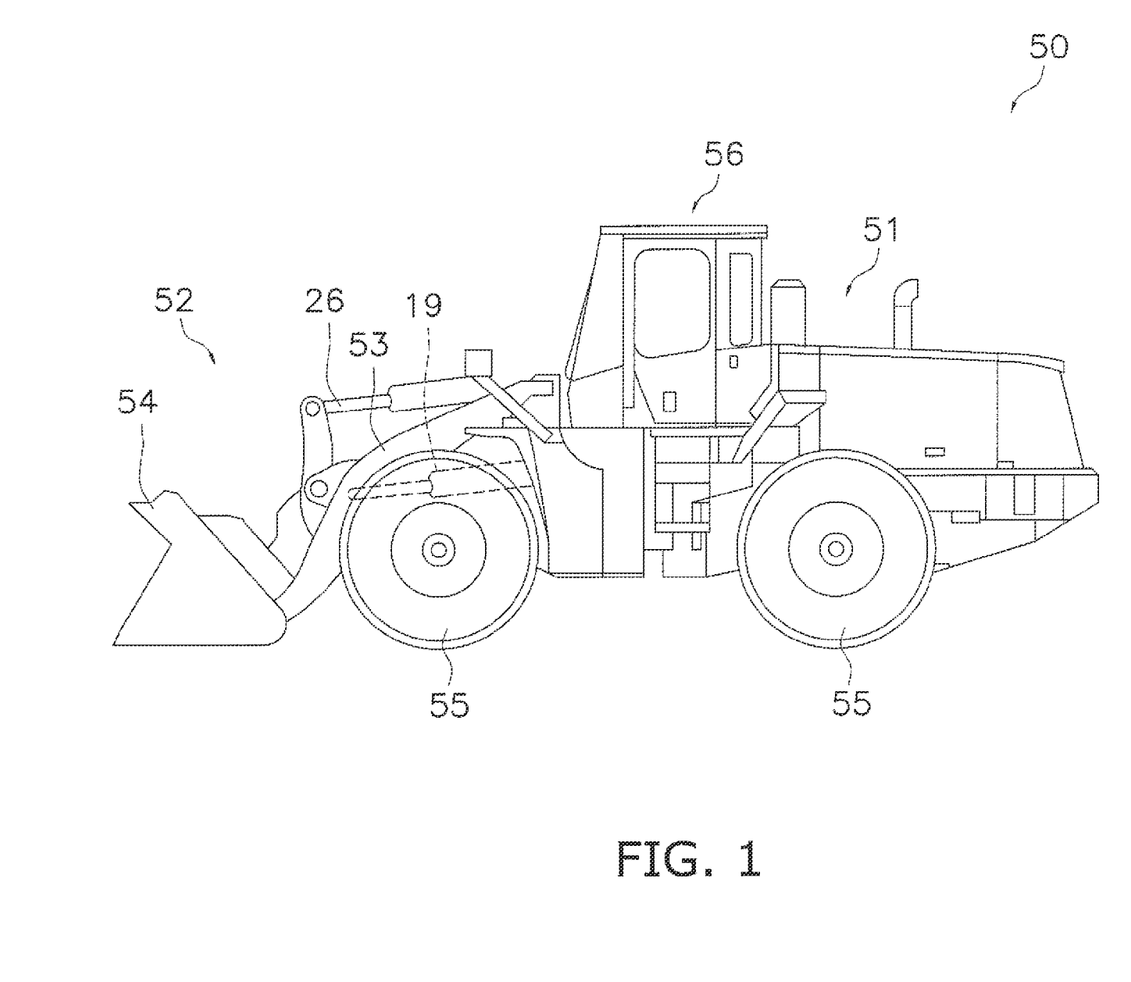
FIG. 1 is a side view of a configuration of a work vehicle according to a first embodiment of the present invention.

Herein, a work vehicle 50 according to a first embodiment of the present invention will be explained in reference to the accompanying drawings FIG. 1 is a side view of the work vehicle 50. The work vehicle 50 is a wheel loader. The work vehicle 50 includes a vehicle body 51, working equipment 52, a plurality of tires 55, and a cab 56. The working equipment 52 is mounted onto a front portion of the vehicle body 51. The working equipment 52 includes a boom 53, a bucket 54, a lifting cylinder 119, and a bucket cylinder 26. The boom 53 is a member for lifting the bucket 54. The boom 53 is driven by the lift cylinder 19. The bucket 54 is attached to the tip of the boom 53. The bucket 54 is dumped and tilted due to the bucket cylinder 26. The cab 56 is mounted on the vehicle body 51.

Figure 2:
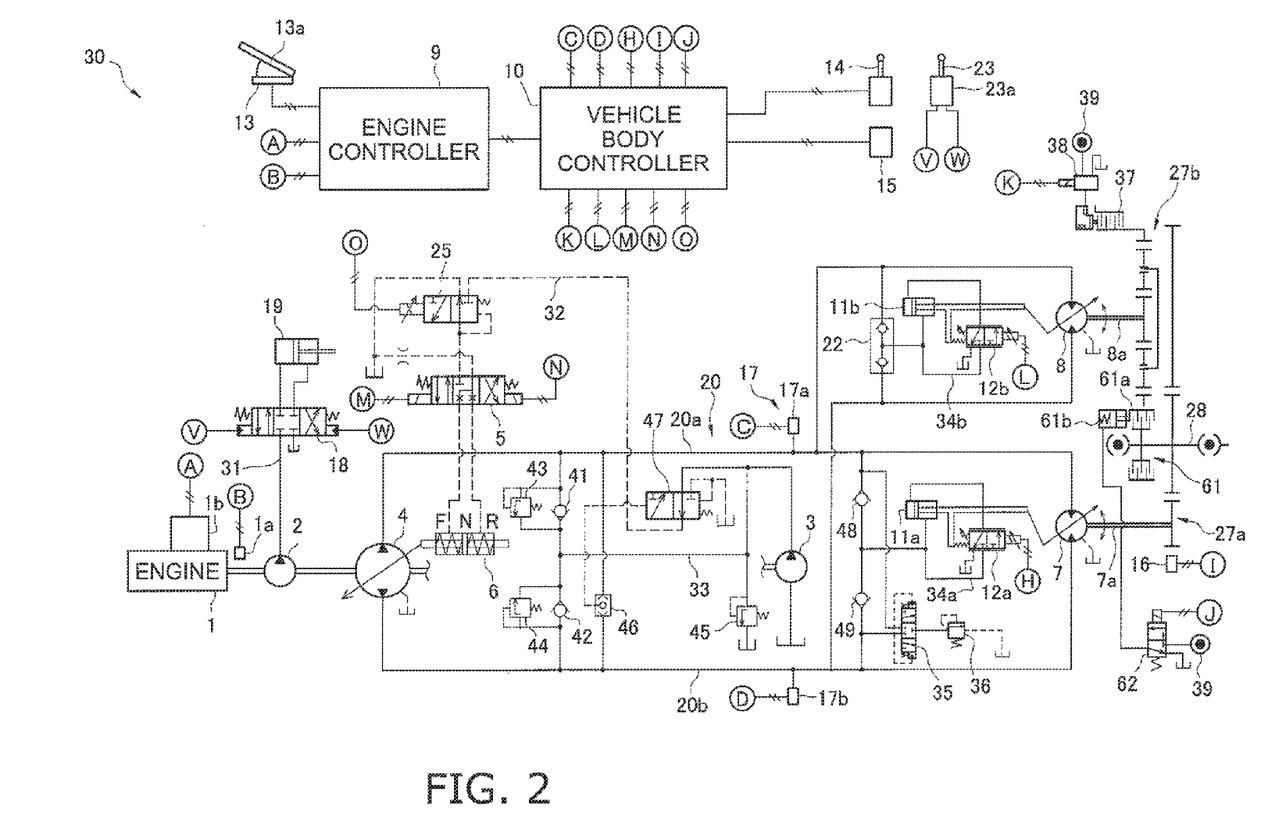
FIG. 2 is a hydraulic circuit diagram showing an HST system installed in the work vehicle according to the first embodiment of the present invention.

FIG. 2 is a block diagram showing a configuration of a hydraulic drive mechanism 30 installed in the work vehicle 50. The hydraulic drive mechanism 30 mainly includes an engine 1, a second hydraulic pump 2, a charge pump 3, a first hydraulic pump 4, a first hydraulic motor 7, a second hydraulic motor 8, an engine controller 9, a vehicle body controller 10, and a drive hydraulic circuit 20. The first hydraulic pump 4 is driven by the engine 1 to discharge hydraulic fluid in the hydraulic drive mechanism 30. The first hydraulic motor 7 is driven by the hydraulic fluid discharged from the first hydraulic pump 4. Moreover, the second hydraulic motor 8 is driven by the hydraulic fluid discharged from the first hydraulic pump 4. When traveling at a slow speed, the work vehicle 50 travels due to the first hydraulic motor 7 and the second hydraulic motor 8 rotationally driving the abovementioned tires 55. When traveling at a high speed, the work vehicle 50 travels due to the first hydraulic motor 7 rotationally driving the tires 55. That is, a so-called one pump two motor HST system is used in the hydraulic drive mechanism 30.

The engine 1 is a diesel engine, and output torque generated by the engine 1 is transferred to the second hydraulic pump 2, the charge pump 3, and the first hydraulic pump 4 and the like. The hydraulic drive mechanism 30 is provided with an engine rotation speed sensor 1a to detect the actual rotation speed of the engine 1. The engine 1 is also connected to a fuel injection device 1b. The below-mentioned engine controller 9 controls the output torque (below referred to as "engine torque") and the rotation speed of the engine 1 by controlling the fuel injection device 1b in response to a set target engine rotation speed.

The first hydraulic pump 4 is driven by the engine 1 to discharge hydraulic fluid. The first hydraulic pump 4 is a variable displacement type of hydraulic pump. The hydraulic fluid discharged from the first hydraulic pump 4 is fed through the drive hydraulic circuit 20 to the first hydraulic motor 7 and the second hydraulic motor 8. Specifically, the drive hydraulic circuit 20 has a first drive circuit 20a and a second drive circuit 20b. The first hydraulic pump 4 is switched between a first discharge state, a second discharge state, and a neutral state. The first hydraulic pump 4 discharges the hydraulic fluid to the first drive circuit 20a under the first discharge state. By supplying the hydraulic fluid from the first hydraulic pump 4 through the first drive circuit 20a to the first hydraulic motor 7 and the second hydraulic motor 8, the first hydraulic motor 7 and the second hydraulic motor 8 are driven in one direction (e.g., the forward direction). The first hydraulic pump 4 discharges the hydraulic fluid to the second drive circuit 20b under the second discharge state. By supplying the hydraulic fluid from the first hydraulic pump 4 through the second drive circuit 20b to the first hydraulic motor 7 and the second hydraulic motor 8, the first hydraulic motor 7 and the second hydraulic motor 8 are driven in another direction (e.g., the reverse direction). The displacement of the first hydraulic pump 4 becomes the minimum displacement (e.g., zero) under the neutral state. For example, when the first hydraulic pump 4 is a hydraulic pump having a swashplate, the "neutral state" means that the swashplate is set in a neutral position.

A drive circuit pressure detecting unit 17 is provided in the drive hydraulic circuit 20. The drive circuit pressure detecting unit 17 detects a pressure (referred to below as "drive circuit pressure") of the hydraulic fluid supplied through the first drive circuit 20a or the second drive circuit 20b to the first hydraulic motor 7 and the second hydraulic motor 8. Specifically, the drive circuit pressure detecting unit 17 has a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure sensor 17a and the second drive circuit pressure sensor 17b send detection signals to the vehicle body controller 10. The first hydraulic pump 4 is connected to an FR switching part 5 and a pump displacement control cylinder 6 for controlling the discharging direction of the first hydraulic pump 4.

The FR switching part 5 is an electromagnetic control valve that switches a supply direction of the hydraulic fluid to the pump displacement control cylinder 6 on the basis of a control signal from the vehicle body controller 10. The FR switching part 5 switches the discharge direction of the first hydraulic pump 4 by switching the supply direction of the hydraulic fluid to the pump displacement control cylinder 6. Specifically, the FR switching part 5 switches the discharge direction of the first hydraulic pump 4 between a discharge to the first drive circuit 20a and a discharge to the second drive circuit 20b. The pump displacement control cylinder 6 is driven by the supply of hydraulic fluid through a pump pilot circuit 32 to change the tilt angle of the first hydraulic pump 4.

A pilot pressure control unit 25 is provided in the pump pilot circuit 32. The pilot pressure control unit 25 is an electromagnetic control valve that is controlled on the basis of a control signal from the vehicle body controller 10. The pilot pressure control unit 25 controls the pressure of the hydraulic fluid supplied through the pump pilot circuit 32 to the pump displacement control cylinder 6. Specifically, the tilt angle of the first hydraulic pump 4 is adjusted by changing the hydraulic pressure inside the pump displacement control cylinder 6 on the basis of the control signal from the vehicle body controller 10.

The pump pilot circuit 32 is connected to a charge circuit 33 and an hydraulic fluid tank via a cutoff valve 47. A pilot port of the cutoff valve 47 is connected to the first drive circuit 20a and the second drive circuit 20b via a shuttle valve 16. The shuttle valve 16 introduces the largest of the hydraulic pressure of the first drive circuit 20a and the hydraulic pressure of the second drive circuit 20b to the pilot port of the cutoff valve 47. As a result, the drive circuit pressure is applied to the pilot port of the cutoff valve 47. The cutoff valve 47 couples the charge circuit 33 and the pump pilot circuit 32 when the drive circuit pressure is lower than a predetermined cutoff pressure. As a result, hydraulic fluid is supplied from the charge circuit 33 to the pump pilot circuit 32. The cutoff valve 47 couples the pump pilot circuit 32 and the hydraulic fluid tank to relieve the hydraulic fluid in the pump pilot circuit 32 into the hydraulic fluid tank when the drive circuit pressure is not lower than the predetermined cutoff pressure. As a result, the displacement of the first hydraulic pump 4 is decreased and a rise in the drive circuit pressure is suppressed by decreasing the hydraulic pressure in the pump pilot circuit 32.

The charge pump 3 is driven by the engine 1 and is a pump for supplying hydraulic fluid to the drive hydraulic circuit 20. The charge pump 3 is a fixed displacement pump. The charge pump 3 is connected to a charge circuit 33. The charge pump 3 supplies hydraulic fluid through the charge circuit 33 to the pump pilot circuit 32. The charge circuit 33 is connected to the first drive circuit 20a via a first check valve 41. The first check valve 41 allows the flow of hydraulic fluid from the charge circuit 33 to the first drive circuit 20a, but restricts the flow of hydraulic fluid from the first drive circuit 20a to the charge circuit 33. The charge circuit 33 is connected to the second drive circuit 20b via a second check valve 42. The second check valve 42 allows the flow of hydraulic fluid from the charge circuit 33 to the second drive circuit 20b, but restricts the flow of hydraulic fluid from the second drive circuit 20b to the charge circuit 33. The charge circuit 33 is connected to the first drive circuit 20a via a first relief valve 43. The first relief valve 43 is opened when the hydraulic pressure in the first drive circuit 20a exceeds a predetermined pressure. The charge circuit 33 is connected to the second drive circuit 20b via a second relief valve 44. The second relief valve 44 is opened when the hydraulic pressure in the second drive circuit 20b exceeds a predetermined pressure. The charge circuit 33 is connected to the hydraulic fluid tank via a low pressure relief valve 45. The low pressure relief valve 45 is opened when the hydraulic pressure in the charge circuit 33 exceeds a predetermined relief pressure. As a result, the charge pressure is adjusted so as not to exceed the predetermined relief pressure.

The second hydraulic pump 2 is driven by the engine 1. Hydraulic fluid discharged from the second hydraulic pump 2 is supplied through a working equipment hydraulic circuit 31 to the lift cylinder 19. As a result, the working equipment 52 is driven. Hydraulic fluid discharged from the second hydraulic pump 2 is also supplied through the working equipment hydraulic circuit 31 to a steering cylinder (not shown). As a result, the orientation of the work vehicle 50 can be changed. A working equipment control valve 18 is provided in the working equipment hydraulic circuit 311. The working equipment control valve 18 is driven according to an operation amount of a working equipment operating member 23. The working equipment control valve 18 controls the flow rate of the hydraulic fluid supplied to the lift cylinder 19 in response to a pilot pressure applied to a pilot port. The pilot pressure applied to the pilot port of the working equipment control valve 18 is controlled by a pilot valve 23a of the working equipment operating member 23. The pilot valve 23a applies pilot pressure to the pilot port of the working equipment control valve 18 in response to an operation amount of the working equipment operating member 23. As a result, the lift cylinder 19 is controlled in response to the operation amount of the working equipment operating member 23. The bucket cylinder 26 is also controlled by a control valve in the same way as the lift cylinder 19, but the description is omitted in FIG. 2.

The first hydraulic motor 7 is a variable displacement hydraulic pump. The first hydraulic motor 7 is driven by the hydraulic fluid discharged from the first hydraulic pump 4 to generating driving power for traveling. The first hydraulic motor 7 is provided with a first motor cylinder 11a and a first motor displacement control unit 12a. The first motor cylinder 11a changes the tilt angle of the first hydraulic motor 7. The first motor displacement control unit 12a is an electromagnetic control valve that is controlled on the basis of a control signal from the vehicle body controller 10. The first motor displacement control unit 12a controls the first motor cylinder 11a on the basis of a control signal from the vehicle body controller 10. The first motor cylinder 11a and the first motor displacement control unit 12a are connected to a first motor pilot circuit 34a. The first motor pilot circuit 3'1a is connected to the first drive circuit 20a via a check valve 48. The check valve 48 allows the flow of hydraulic fluid from the first drive circuit 20a to the first motor pilot circuit 34a, but restricts the flow of hydraulic fluid from the first motor pilot circuit 34a to the first drive circuit 20a. The first motor pilot circuit 34a is connected to the second drive circuit 20b via a check valve 49. The check valve 49 allows the flow of hydraulic fluid from the second drive circuit 20b to the first motor pilot circuit 34a, but restricts the flow of hydraulic fluid from the first motor pilot circuit 34a to the second drive circuit 20b. The largest of the hydraulic pressures of the first drive circuit 20a and the second drive circuit 20b, that is, the hydraulic fluid of the drive circuit pressure, is supplied to the first motor pilot circuit 34a by the check valves 48 and 49. The first motor displacement control unit 12a switches the supply direction and the supply flow rate of the hydraulic fluid from the first motor pilot circuit 34a to the first motor cylinder 11.a on the basis of a control signal from the vehicle body controller 10. As a result, the vehicle body controller 10 is able to freely change the displacement of the first hydraulic motor 7.

The first drive circuit 20a and the second drive circuit 20h are connected to a low pressure selector valve 35. The low pressure selector valve 35 connects the circuit with the lowest hydraulic pressure among the first drive circuit 20a and the second drive circuit 20b to the hydraulic fluid tank via a relief valve 36.

The second hydraulic motor 8 is a variable displacement hydraulic motor. The second hydraulic motor 8 is driven by the hydraulic fluid discharged from the first hydraulic pump 4 to generate driving power for traveling. The second hydraulic motor 8 is provided with a second motor cylinder 11b and a second motor displacement control unit 12b. The second motor cylinder 11b changes the tilt angle of the second hydraulic motor 8. The second motor displacement control unit 12b is an electromagnetic control valve that is controlled on the basis of a control signal from the vehicle body controller 10. The second motor displacement control unit 12b controls the second motor cylinder 11b on the basis of a control signal from the vehicle body controller 10. The second motor cylinder 11b and the second motor displacement control unit 12b are connected to a second motor pilot circuit 34b. The second motor pilot circuit 34b is connected to the first drive circuit 20a and the second drive circuit 20h via a shuttle valve 22. The shuttle valve 22 connects the circuit with the highest hydraulic pressure among the first drive circuit 20a and the second drive circuit 20b to the second motor pilot circuit 34b. The largest of the hydraulic pressures of the first drive circuit 20a and the second drive circuit 20b, that is, the hydraulic fluid of the drive circuit pressure, is supplied to the second motor pilot circuit 34b by the shuttle valve 22. The second motor displacement control unit 12b switches the supply direction and the supply flow rate of the hydraulic fluid from the second motor pilot circuit 34b to the second motor cylinder 11b on the basis of a control signal from the vehicle body controller 110. As a result, the vehicle body controller 110 is able to freely change the displacement of the second hydraulic motor 8.

An output shaft 7a of the first hydraulic motor 7 is connected to a drive shaft 28 via a first decreasing mechanism 27a. An output shaft 8a of the second hydraulic motor 8 is connected to the drive shaft 28 via a clutch 37 and a second decreasing mechanism 27b. The drive shaft 28 is connected to the abovementioned tires 55. The clutch 37 is switched between an engaged state and a disengaged state. In the engaged state, the clutch 37 couples the second hydraulic motor 8 and the drive shaft 28. Thus, when the clutch 37 is in the engaged state, the driving power from the first hydraulic motor 7 and the driving power from the second hydraulic motor 8 are transferred to the drive shaft 28. As a result, the tires 55 are rotationally driven. In the disengaged state, the clutch 37 uncouples the second hydraulic motor 8 and the drive shaft 28. Thus, when the clutch 37 is in the disengaged state, only the driving power from the first hydraulic motor 7 among the first hydraulic motor 7 and the second hydraulic motor 8 is transferred to the drive shaft 28. As a result, the tires 55 are rotationally driven.

The hydraulic drive mechanism 30 includes a clutch control unit 38 for controlling the switching of the clutch 37. The clutch control unit 38 is an electromagnetic control valve that is controlled on the basis of a control signal front the vehicle body controller 10. The vehicle body controller 10 switches the engaged state and the disengaged state of the clutch 37 by controlling the clutch control unit 38. Specifically, the clutch control unit 38 switches between exhausting and supplying hydraulic fluid from a pilot hydraulic power source 39 to the clutch 37 on the basis of a control signal from the vehicle body controller 10. As a result, the clutch is switched between engaged state and the disengaged state.

The hydraulic drive mechanism 30 includes a parking brake 61 and a parking brake control unit 62. The parking brake 61 is switched between a braking state and a non-braking state. The parking brake 61 dampens the drive shaft 28 under the braking state. The parking brake 61 releases the drive shaft 28 under the non-braking state. The parking brake control unit 62 is an electromagnetic control valve that is controlled on the basis of a control signal from the vehicle body controller 10. The vehicle body controller 10 switches the parking brake 61 between the braking state and the non-braking state by controlling the parking brake control unit 62. Specifically, parking brake 61 is swithched between the braking state and the non-braking state in response to operation of a below-mentioned parking brake operating member 15. The parking brake control unit 62 can release an actuating command from the parking brake operating member 15 on the basis of a control signal from the vehicle body controller 10. For example, the parking brake control unit 62 can maintain the non-braking state of the parking brake 61 on the basis of a control signal from the vehicle body controller 10 even if the parking brake operating member 15 is operated. Moreover, the parking brake control unit 62 can switch the parking brake 61 to the braking state by stopping the release of the actuating command from the parking brake operating member 15 on the basis of a control signal from the vehicle body controller 10. As a result, the parking brake 61 is switched between a braking state and a non-braking state. For example, the parking brake 61 has a brake disk part 61a and a piston part 61b. When hydraulic fluid is supplied to the piston part 61b, the piston part 61b causes a plurality of brake disks in the brake disk part 61a to contact each other due to hydraulic pressure. As a result, the parking brake 61 enters the braking state. When hydraulic fluid is exhausted from the piston part 61b, the brake disks are held in a state of not contacting each other due to the elastic force of an elastic member provided in the piston part 61b. As a result, the parking brake 61 enters the non-braking state.

The hydraulic drive mechanism 30 is provided with a vehicle speed detecting unit 16. The vehicle speed detecting unit 16 is a sensor that detects the vehicle speed. The vehicle speed detecting unit sends a vehicle speed signal to the vehicle body controller 10. The vehicle speed detecting unit 16 detects the vehicle speed, for example, by detecting the rotation speed of the drive shaft 28.

The work vehicle 50 includes an accelerator operating member 13a, a forward and reverse switch operating member 14, and the parking brake operating member 15.

The accelerator operating member 13a is a member for an operator to set the target rotation speed of the engine 1. The accelerator operating member 13a is, for example, an accelerator pedal operated by the operator. The accelerator operating member 13a is connected to an accelerator operation amount sensor 13. The accelerator operation amount sensor 13 is configured as a potentiometer and the like. The accelerator operation amount sensor 113 sends an opening degree signal indicating an operation amount (referred to below as "accelerator operation amount") of the accelerator operating member 13a to the engine controller 9. The operator is able to control the rotation speed of the engine 1 by adjusting the accelerator operation amount.

The forward and reverse switch operating member 14 is operated by the operator to be switched between a forward position, a reverse position, and a neutral position. The forward and reverse switch operating member 14 sends an operation signal that indicates the position of the forward and reverse switch operating member 14 to the vehicle body controller 10. The operator can switch between forward and reverse movement of the work vehicle 50 by operating the forward and reverse switch operating member 14.

The parking brake operating member 15 is operated to activate the parking brake. The parking brake operating member 15 is, for example, a parking switch or a parking lever and is operated by the operator. When the parking brake operating member 15 is operated, an operation signal is sent to the vehicle body controller 10.

Figure 3:
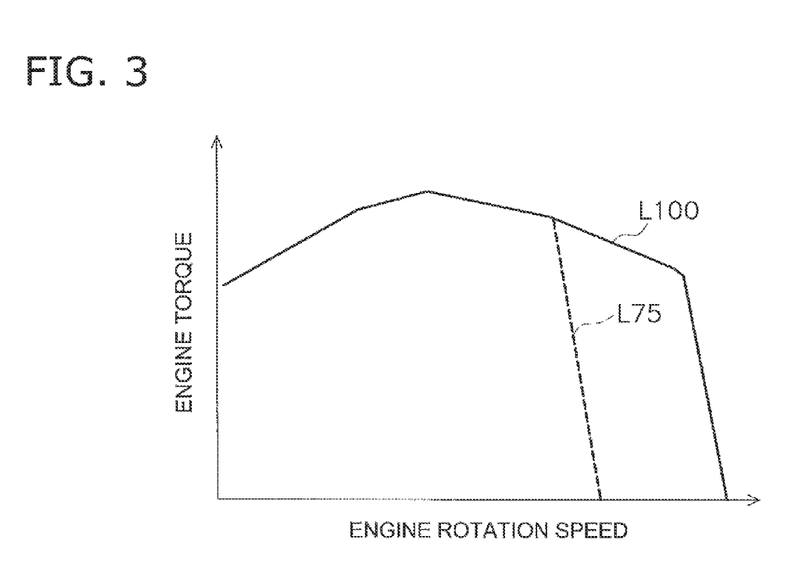
FIG. 3 shows an example of an engine output torque curve.

The engine controller 9 is an electronic control unit having various types of memory and the like and a computing device such as a CPU. The engine controller 9 controls the engine 1 so that a target rotation speed set via the accelerator operating member 13a can be obtained. FIG. 3 shows an example of an output torque curve of the engine. The output torque curve of the engine 1 indicates the relationship between the rotation speed of the engine 1 and the size of the maximum engine torque that the engine 1 can output at various rotation speeds. In FIG. 3, the curve L100 represents an engine output torque curve when the accelerator operation amount is 100%. The engine output torque curve corresponds to, for example, a regulated or a maximum power output of the engine 1. The accelerator operation amount at 100% indicates a state in which the accelerator operating member 13a is being operated to a maximum level. Moreover, the curve L75 indicates an engine output torque curve when the accelerator operation amount is 75%. The engine controller 9 controls the output of the engine 1 so that the engine torque does not exceed the engine output torque curve. The control of the engine 1 output is conducted, for example, by controlling the upper limit of a fuel injection amount to the engine 1.

The vehicle body controller 10 is an electronic control unit having various types of memory and the like and a computing device such as a CPU. The vehicle body controller 10 is an example of a control unit of the present invention. The vehicle body controller 10 controls the displacement of the first hydraulic pump 4 and the displacement of the first hydraulic motor 7 by electronically controlling control valves on the basis of output signals from detecting units.

Figure 4:
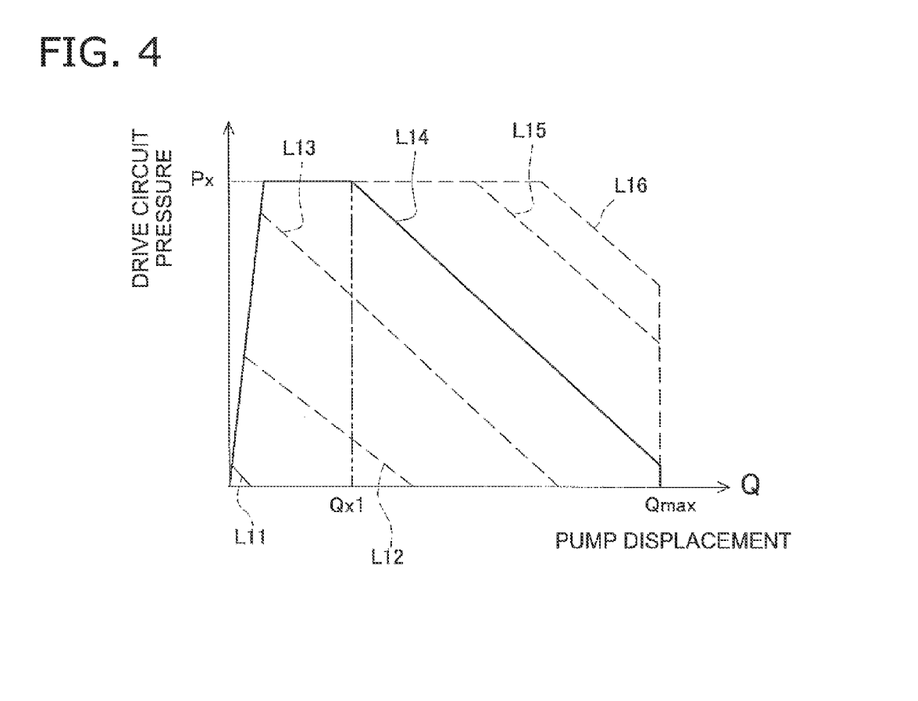
FIG. 4 shows an example of pump displacement-drive circuit pressure characteristics.

Specifically, the vehicle body controller 10 outputs a command signal to the pilot pressure control unit 25 on the basis of the engine rotation speed detected by the engine rotation speed sensor 1a. As a result, the relationship between the pump displacement and the drive circuit pressure is regulated. FIG. 4 shows an example of pump displacement-drive circuit pressure characteristics. The pump displacement-drive circuit pressure characteristics show the relationship between the pump displacement and the drive circuit pressure. Lines L11 to L16 in FIG. 4 show the pump displacement-drive circuit pressure characteristics changed in response to the engine rotation speed. Specifically, the pump displacement-drive circuit pressure characteristics are changed to lines L11 to L16 by the vehicle body controller 10 controlling the flow rate of the pilot pressure control unit 25 on the basis of the engine rotation speed. As a result, the pump displacement can be controlled in response to the engine rotation speed and the drive circuit pressure. As the engine rotation speed increases, the pump displacement-drive circuit pressure characteristics change from line L11 toward line L16. As shown by lines L11 to L13, the pump displacement-drive circuit pressure characteristics are set so that the pump displacement is decreased as the drive circuit pressure increases, and the pump displacement increases as the drive circuit pressure decreases. At the pump displacement-drive circuit pressure characteristic indicated by the line L14, the drive circuit pressure becomes constant at a value Px of the abovementioned cutoff pressure due to the action of the cutoff valve 47 when the pump displacement is equal to or less than a predetermined pump displacement value Qx1. At the pump displacement-drive circuit pressure characteristics indicated by the lines L15 and L16, the upper limit of the drive circuit pressure becomes constant at the value Px of the abovementioned cutoff pressure in the same way.

The vehicle body controller 10 sets the abovementioned clutch 37 to the engaged state when the vehicle speed is less than a (predetermined switching speed. As a result, the output shaft 7a of the first hydraulic motor 7 is connected to the drive shaft 28 via the first decreasing mechanism 27a. Moreover, the output shaft 8a of the second hydraulic motor 8 is connected to the drive shaft 28 via the second decreasing mechanism 27b. As a result, the driving powers of both the first hydraulic motor 7 and the second hydraulic motor 8 are transferred to the drive shaft 28 (this traveling state is referred to below as a "twin motor traveling state"). The vehicle body controller 10 sets the clutch 37 to the disengaged state when the vehicle speed is equal to or greater than the predetermined switching speed. As a result, the output shaft 7a of the first hydraulic motor 7 is connected to the drive shaft 28 via the first decreasing mechanism 27a. However, the output shaft 8a of the second hydraulic motor 8 is not connected to the drive shaft 28. As a result, the driving power of only the first hydraulic motor 7 among the first hydraulic motor 7 and the second hydraulic motor 8 is transferred to the drive shaft 28 (this traveling state is referred to below as a "single motor traveling state"). Therefore, when the vehicle speed is at a low traveling speed that is less than the predetermined switching speed, the work vehicle 50 travels in the twin motor traveling state. Further, when the vehicle speed is at a high traveling speed that is equal to or greater than the predetermined switching speed, the work vehicle 50 travels in the single motor traveling state.

Figure 5:
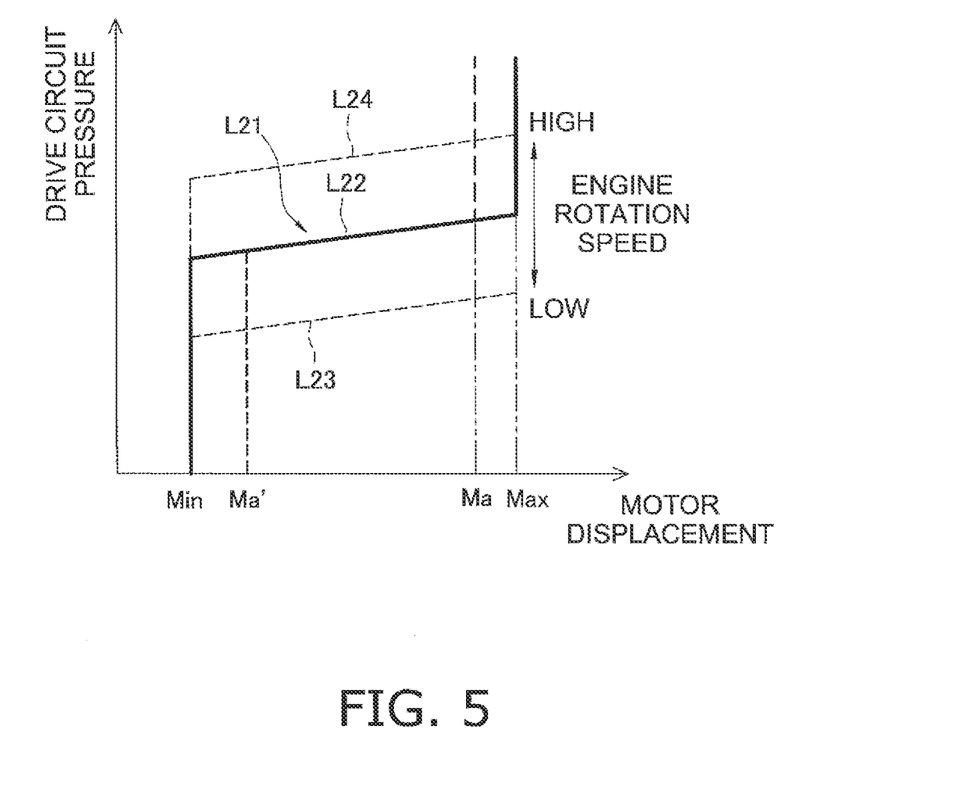
FIG. 5 shows an example of motor displacement-drive circuit pressure characteristics.

The following is an explanation of the control of the first hydraulic motor 7 displacement under the single motor traveling state. The vehicle body controller 10 processes output signals from the engine rotation speed sensor 1a and the drive circuit pressure detecting unit 17 and outputs a motor displacement command signal to the first motor displacement control unit 12.a. The vehicle body controller 10 at this time refers to the motor displacement-drive circuit pressure characteristics stored in the vehicle body controller 10 and sets the motor displacement from an engine rotation speed value and a drive circuit pressure value. The vehicle body controller 10 outputs a tilt angle change command corresponding to the set motor displacement to the first motor displacement control unit 12a. FIG. 5 shows an example of motor displacement-drive circuit pressure characteristics. The solid line L21 in FIG. 5 defines the motor displacement with respect to the drive circuit pressure under a state of the engine rotation speed at a predetermined value. The motor displacement here corresponds to the tilt angle of the first hydraulic motor 7. The tilt angle is minimal (Min) until the drive circuit pressure reaches or falls below a constant value. Then, the tilt angle is gradually increased accompanying a rise in the drive circuit pressure (the solid line sloped portion L22). After the tilt angle reaches the maximum (Max), the tilt angle is maintained at the maximum tilt angle Max even if the drive circuit pressure rises. The sloped portion L22 regulates a target pressure of the drive circuit pressure. That is, the vehicle body controller 10 increases the first hydraulic motor 7 displacement when the drive circuit pressure exceeds the target pressure. Moreover, the first hydraulic motor 7 displacement decreases when the chive circuit pressure becomes less than the target pressure. The target pressure is determined in accordance with the engine rotation speed. That is, the sloped portion L22 in FIG. 5 is set to rise or fall in accordance with an increase or decrease of the engine rotation speed. Specifically, the sloped portion 122 is controlled so that, if the engine rotation speed is low, the tilt angle increases from a state when the drive circuit pressure is lower and reaches the maximum tilt angle in a state when the drive circuit pressure is lower (see the dashed line sloped portion L23 toward the bottom of FIG. 5). Conversely if the engine rotation speed is high, the sloped portion L22 is controlled so that the minimum tilt angle Min is maintained until the drive circuit pressure becomes higher, and reaches the maximum tilt angle Max in a state when the drive circuit pressure is higher (see the dashed line sloped portion L24 toward the top of FIG. 5). As a result, the work vehicle changes the tractive three and the vehicle speed without steps and can automatically change the vehicle speed from zero to the maximum speed without speed change operation.

The vehicle body controller 10 is able to freely set an upper limit displacement and a lower limit displacement within a range between the maximum displacement Max and the minimum displacement Min of the first hydraulic motor 7. The upper limit displacement is set as an upper limit value of the first hydraulic motor 7 displacement. The lower limit displacement is set as a lower limit value of the first hydraulic motor 7 displacement. For example in FIG. 5, the displacement of the first hydraulic motor 7 is limited to a value not greater than an upper limit displacement Ma that is smaller than the maximum displacement Max by setting the upper limit displacement to Ma. As a result, the maximum tractive force can be decreased more than when an upper limit displacement is not set. Further in FIG. 5, the displacement of the first hydraulic motor 7 is limited to a value equal to or greater than a lower limit displacement Ma' that is greater than the minimum displacement Min by setting the lower limit displacement to Ma'. As a result, the maximum vehicle speed can be decreased more than when a lower limit displacement is not set. In the twin motor traveling state, the vehicle body controller 10 outputs to the second motor displacement control unit 12b a command signal of the motor displacement set in the same way as described above.

Figure 6:
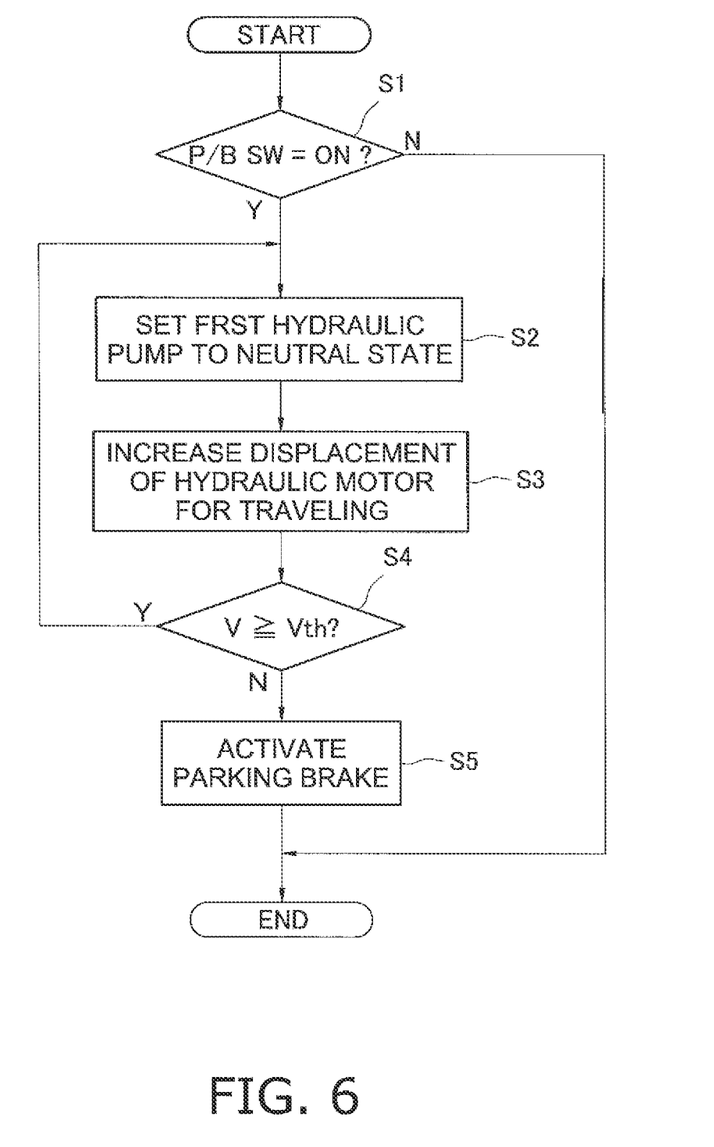
FIG. 6 is a flow chart showing a brake control procedure.

The following is an explanation regarding brake control executed by the vehicle body controller 10. FIG. 6 is a flow chart of a brake control procedure.

In step S1, whether the parking brake operating member 15 (P/BSW) is operated or not is determined. Here, "parking brake operating member 15 is operated" means an operation for setting the braking state of the parking brake 61. When the parking brake operating member is operated, the vehicle body controller 10 sets the first hydraulic pump 4 to the neutral state in step S2. As a result, the displacement of the first hydraulic pump 4 becomes the minimum displacement.

Figure 7:
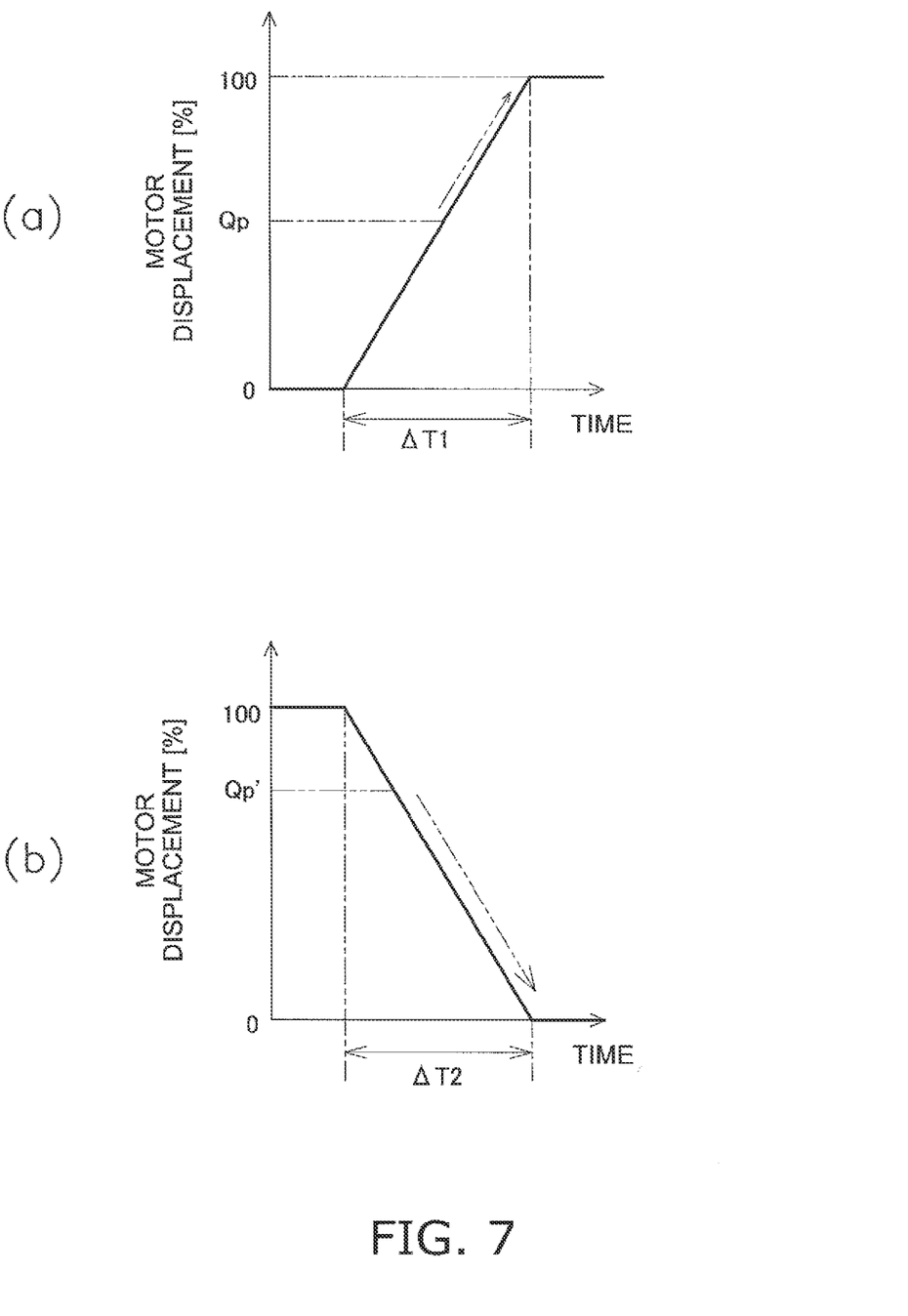
FIG. 7 shows graphs of change speeds of motor displacement under the brake control.

In step S3, the vehicle body controller 10 increases the first hydraulic motor 7 displacement. For example, if the first hydraulic motor 7 is a hydraulic motor type having an inclined shaft, the inclined shaft is activated in a direction to increase the first hydraulic motor 7 displacement. As a result, the work vehicle 50 decelerates due to an increase in the resistance force in the first hydraulic motor 7. Specifically, the vehicle body controller 10 gradually increases the lower limit displacement of the first hydraulic motor 7 from the displacement of the first hydraulic motor 7 at the point in time when the parking brake operating member 15 was operated to the maximum displacement by controlling the flow rate of the hydraulic fluid supplied to the pump displacement control cylinder 6 with the pilot pressure control unit 25. As a result, the vehicle body controller 10 decreases the vehicle speed. FIG. 7 shows change speeds of the first hydraulic motor 7 displacement. FIG. 7(a) shows the first hydraulic motor 7 displacement change speed (referred to below as "increase speed") when the first hydraulic motor 7 displacement is increased under the brake control. As shown in FIG. 7(a), the increase speed is defined as the time $\Delta T1$ when the first hydraulic motor 7 displacement changes from 0% to 100%. The vehicle body controller 10 sets the first hydraulic motor 7 displacement Qp at the point in time that the parking brake operating member 15 was operated as the lower limit displacement of the first hydraulic motor 7, and then gradually increases the first hydraulic motor 7 lower limit displacement from Qp to the maximum displacement (100%) with the abovementioned increase speed. Conversely, FIG. 7(b) shows the first hydraulic motor 7 displacement change speed (referred to below as "decrease speed") when the first hydraulic motor 7 displacement is decreased under the brake control. As shown in FIG. 7(b), the decrease speed is defined as the time $\Delta T2$ when the first hydraulic motor 7 displacement changes from 100% to 0%. The vehicle body controller 10 returns the first hydraulic motor 7 displacement to the lower limit in the normal state when an operation to release the parking brake 61 is conducted. The vehicle body controller 10 sets the first hydraulic motor 7 displacement Qp' at the point in time that the parking brake 61 was released as the lower limit displacement of the first hydraulic motor 7, and then gradually decreases the first hydraulic motor 7 lower limit displacement from Qp' to the lower limit in the normal state. The normal state here means a state in which brake control is not performed. The decrease speed is the same as the increase speed, or preferably greater than the increase speed.

In step S4, a determination is made as to whether the vehicle speed V is equal to or greater than a predetermined threshold Vth. If the vehicle speed V is equal to or greater than the predetermined threshold Vth, the routine returns to step S2. That is, when the vehicle speed V is equal to or greater than the predetermined threshold Vth, the work vehicle 50 is decelerated due to the increase in the first hydraulic motor 7 displacement without the parking brake 61 being activated.

If the vehicle speed V is less than the predetermined threshold Vth in step S4, the routine advances to step S5. In step S5, the vehicle body controller 10 activates the parking brake 61. As a result, the work vehicle 50 is further decelerated and stopped due to the braking force of the parking brake 61. The predetermined threshold Vth is a value larger than zero. The predetermined threshold Vth is preferably a value approximately the same as the abovementioned switching speed. As a result, the vehicle body controller 10 activates the parking brake 61 under the brake control when the clutch 37 is switched to the engaged state. Specifically, the vehicle body controller 10 activates the parking brake 61 when the single motor traveling state is switched to the twin motor traveling state while the brake control is being executed.

When the vehicle speed V is less than the predetermined threshold Vth, braking by the parking brake 61 and braking by the resistance force of the first hydraulic motor 7 may be used concurrently. Alternatively, when the vehicle speed V is less than the predetermined threshold Vth, the braking by the parking brake 61 may be performed and the braking by the resistance force of the first hydraulic motor 7 may be stopped.

As described above, the work vehicle according to the present embodiment is configured so that the displacement of the first hydraulic pump 4 is decreased and the displacement of the first hydraulic motor 7 is increased without activating the parking brake 61 when the vehicle speed is equal to or greater than the predetermined threshold even if the parking brake operating member 15 is operated. As a result, the vehicle speed can be gradually decreased due to an increase in the resistance force in the first hydraulic motor 7. The parking brake is activated when the vehicle speed falls below the predetermined threshold. As a result, the vehicle speed is further decreased and the work vehicle 50 stops. As a result, the work vehicle 50 can be stopped while decreasing the occurrence of a shock.

The first hydraulic motor 7 displacement is gradually increased with the increase speed shown in FIG. 7 under the brake control. As a result, a sudden change in the displacement of the first hydraulic motor is suppressed. Consequently, deceleration is made possible while decreasing the occurrence of a shock.

While an embodiment of the present invention has been described above, the present invention is not limited to the above-described embodiment and various modifications are possible without departing from the spirit of the invention.

A wheel loader has been raised in the above explanations as an example of the work vehicle 50 to which the present invention is applied. However, the present invention is not limited to this example. For example, the present invention can be applied to other work vehicles having an HST system installed therein such as a bulldozer or a backhoe loader.

An example was raised in the above explanations of the work vehicle 50 having a so-called one-pump two-motor HST system installed therein where two hydraulic motors are driven by hydraulic fluid from one hydraulic pump. However, the present invention is not limited to this example. For example, the present invention may be applied to a work vehicle having a so-called one-pump one-motor HST system installed therein where one hydraulic motor is driven by hydraulic fluid from one hydraulic pump.

According to the illustrated embodiment, a work vehicle and a control method for a work vehicle are provided that allows a vehicle to be decelerated while suppressing the occurrence of a shock when the parking brake is actuated while the vehicle is traveling.

The invention claimed is:

1. A working vehicle comprising:
an engine;
a hydraulic pump driven by the engine;
a first hydraulic motor driven by hydraulic fluid discharged from the hydraulic pump;
a vehicle speed detecting unit configured to detect a vehicle speed;
a parking brake;
a parking brake operating member configured to be operated to activate the parking brake; and
a control unit configured to determine whether the vehicle speed is equal to or greater than a predetermined threshold when the parking brake operating member is operated, the control unit being configured to
execute a brake control that decreases a displacement of the first hydraulic pump and increases a displacement of the first hydraulic motor without activating the parking brake when the vehicle speed is equal to or greater than the predetermined threshold in a state when the vehicle is traveling and
activate the parking brake when the vehicle speed falls below the predetermined threshold.

2. The working vehicle according to claim 1, wherein
the control unit is configured to decrease the vehicle speed by gradually increasing a lower limit of the displacement of the first hydraulic motor from the displacement of the first hydraulic motor at a point in time when the parking brake operating member is operated to a maximum displacement.

3. A working vehicle comprising:
an engine;
a hydraulic pump driven by the engine;
a first hydraulic motor driven by hydraulic fluid discharged from the hydraulic pump;
a vehicle speed detecting unit configured to detect a vehicle speed;
a parking brake;
a parking brake operating member configured to be operated to activate the parking brake;
a drive shaft to which driving power from the first hydraulic motor is transferred;
a second hydraulic motor driven by hydraulic fluid discharged from the hydraulic pump;
a clutch configured to be switched between an engaged state in which the second hydraulic motor is coupled to the drive shaft, and a disengaged state in which the second hydraulic motor is uncoupled from the drive shaft;
a control unit configured to determine whether the vehicle speed is equal to or greater than a predetermined threshold when the parking brake operating member is operated, the control unit being configured to
execute a brake control that decreases a displacement of the first hydraulic pump and increases a displacement of the first hydraulic motor without activating the parking brake when the vehicle speed is equal to or greater than the predetermined threshold in a state when the vehicle is traveling,
set the clutch to the engaged state when the vehicle speed is less than a predetermined switching speed, and set the clutch to the disengaged state when the vehicle speed is equal to or greater than the predetermined switching speed, and activate the parking brake when the clutch is switched to the engaged state under the brake control.

4. A control method for a work vehicle including an engine, a hydraulic pump driven by the engine, a first hydraulic motor driven by hydraulic fluid discharged from the hydraulic pump, a vehicle speed detecting unit configured to detect a vehicle speed, a parking brake, and a parking brake operating member configured to be operated for activating the parking brake, the control method comprising:
  determining whether the vehicle speed is equal to or greater than a predetermined threshold when the parking brake operating member is operated;
  decreasing a displacement of the hydraulic pump and increasing a displacement of the first hydraulic motor without activating the parking brake when the vehicle speed is equal to or greater than the predetermined threshold in a state when the vehicle is traveling; and
  activating the parking brake when the vehicle speed falls below the predetermined threshold.

5. A control method for a working vehicle including an engine, a hydraulic pump driven by the engine, a first hydraulic motor driven by hydraulic fluid discharged from the hydraulic pump, a vehicle speed detecting unit configured to detect a vehicle speed, a parking brake, and a parking brake operating member configured to be operated for activating the parking brake, the control method comprising:
  determining whether the vehicle speed is equal to or greater than a predetermined threshold when the parking brake operating member is operated;
  gradually decreasing the vehicle speed by increasing a resistance force of the first hydraulic motor without activating the parking brake when the vehicle speed is equal to or greater than the predetermined threshold in a state when the vehicle is traveling; and
  activating the parking brake when the vehicle speed falls below the predetermined threshold.

* * * * *